United States Patent
Chen et al.

(10) Patent No.: US 7,317,821 B2
(45) Date of Patent: Jan. 8, 2008

(54) AUTOMATIC ABNORMAL TISSUE DETECTION IN MRI IMAGES

(75) Inventors: Shoupu Chen, Rochester, NY (US); Zhimin Huo, Pittsford, NY (US); Lawrence A. Ray, Rochester, NY (US)

(73) Assignee: Carestream Health, Inc., Rochester, NY (US)

( * ) Notice: Subject to any disclaimer, the term of this patent is extended or adjusted under 35 U.S.C. 154(b) by 577 days.

(21) Appl. No.: 10/994,715

(22) Filed: Nov. 22, 2004

(65) Prior Publication Data

US 2006/0110018 A1 May 25, 2006

(51) Int. Cl.
*G06K 9/00* (2006.01)

(52) U.S. Cl. ...................... 382/130; 382/224

(58) Field of Classification Search .............. 382/128, 382/129, 130, 131, 132, 133, 134, 159, 164, 382/165, 171, 173, 177, 179, 224, 227; 600/409, 600/410, 524; 424/9.3
See application file for complete search history.

(56) References Cited

U.S. PATENT DOCUMENTS

| | | | | |
|---|---|---|---|---|
| 5,531,434 A | * | 7/1996 | Kerschner | 271/263 |
| 6,738,502 B1 | * | 5/2004 | Coleman et al. | 382/133 |
| 2003/0095147 A1 | | 5/2003 | Daw | |

OTHER PUBLICATIONS

Paul S. Tofts et al., "Quantative Analysis of Dynamic Gd-DTPA Enhancement in Breast Tumors Using a Permeability Model", 1995, pp. 564-568.
C.W. Piccoli, "Contrast-enhanced breast MRI: factors affecting sensitivity and specificity", Eur. Radiol. 7, Suppl. 5, 1997, pp. 281-288.
Lennart Ljung. "System Identification Toolbox for use with MATLAB", User's Guide, version 5, Tutorial, pp. 9-22.
Christopher J.C. Buges, "A Tutorial on Support Vector Machines for Pattern Recognition", Bell Laboratories, Lucent Technology, pp. 1-43.
S.C. Rankin, Dept. of Radiology, "MRI of the breast", The British Journal of Radiology, Aug. 2000, pp. 806-818.

* cited by examiner

*Primary Examiner*—Samir Ahmed
*Assistant Examiner*—Abolfazl Tabatabai

(57) ABSTRACT

A pattern recognition method for automatic abnormal tissue detection and differentiation using contrast enhanced MRI images. The method includes the steps of acquiring a plurality of MRI breast image sets; aligning the plurality of MRI breast images with respect to spatial coordinates; differencing the plurality of MRI breast image sets with a reference MRI image set, producing a plurality of difference image sets; segmenting the plurality of difference image sets, producing a plurality of MRI breast images with segmented intensity pixels; applying dynamic system identification to the segmented intensity pixels, producing a plurality of dynamic system parameters; and classifying the plurality of system parameters augmented with other physical or non-physical factors into different classes.

12 Claims, 6 Drawing Sheets

AUTOMATIC ABNORMAL TISSUE DETECTION IN MRI IMAGES

FIELD OF THE INVENTION

The present invention relates to a digital image processing/computer vision method for medical image analysis and, in particular, to automatically detecting and differentiating breast abnormal tissues using MRI images, particularly, contrast enhanced MRI images augmented with other factors.

BACKGROUND OF THE INVENTION

Digital imaging techniques in medicine were implemented in the 1970's with the first clinical use and acceptance of the Computed Tomography or CT scanner. Later, extensive use of x-ray imaging (CT) and the advent of the digital computer and new imaging modalities like ultrasound and magnetic resonance imaging (MRI) have combined to create an explosion of diagnostic imaging techniques in the past three decades.

There are benefit to using digital medical imaging technology in health care. For example, angiographic procedures for looking at the blood vessels in the brain, kidneys, arms and legs, and heart all have benefited from the adaptation of digital medical imaging and image processing technologies.

With digital images, computerized multi-dimensional (e.g., spatial and temporal) image analysis becomes possible. Multi-dimensional image analysis can be used in applications such as automatic quantification of changes (anatomical or functional) in serial image volume scans of body parts, foreign objects localization, consistent diagnostic rendering, and the like.

Also, different medical imaging modalities produce images providing different view of human body function and anatomy that have the potential of enhancing diagnostic accuracy dramatically with the help of the right medical image processing software and visualization tools. For example, X-ray computed tomography (CT) and magnetic resonance imaging (MRI) demonstrate brain anatomy but provide little functional information. Positron emission tomography (PET) and single photon emission computed tomography (SPECT) scans display aspects of brain function and allow metabolic measurements but poorly delineate anatomy. Furthermore, CT and MRI images describe complementary morphologic features. For example, bone and calcifications are best seen on CT images, while soft-tissue structures are better differentiated by MRI. Modalities such as MRI and CT usually provide a stack of images for certain body parts.

It is known that the information gained from different dimensions (spatial and temporal) or modalities is often of a difference or complementary nature. Within the current clinical setting, this difference or complementary image information is a component of a large number of applications in clinical diagnostics settings, and also in the area of planning and evaluation of surgical and radiotherapeutical procedures.

In order to effectively use the difference or complementary information, image features from different dimensions or different modalities had to be superimposed to each other by physicians using a visual alignment system. Unfortunately, such a coordination of multiple images with respect to each other is extremely difficult and even highly trained medical personnel, such as experienced radiologists, have difficulty in consistently and properly interpreting a series of medical images so that a treatment regime can be instituted which best fits the patient's current medical condition.

Another problem encountered by medical personnel today is the large amount of data and numerous images that are obtained from current medical imaging devices. The number of images collected in a standard scan can be in excess of 100 and frequently numbers in the many hundreds. In order for medical personnel to properly review each image takes a great deal of time and, with the many images that current medical technology provides, a great amount of time is required to thoroughly examine all the data.

Accordingly, there exists a need for an efficient approach that uses image processing/computer vision techniques to automatically detect/diagnose diseases.

U.S. Patent Application No. 2003/0095147 (Daw), incorporated herein by reference, relates to a computerized method of medical image processing and visualization. In Daw's method, a memory is provided for storing a plurality of data sets, each data set corresponding to an image of a location within a medical body of interest. Each image contains a number of features which correspond to data points that have been collected when creating an image of the medical body. The data points thus correspond to a measured parameter within the medical body. A visual display is provided of the image having a varying color scale for different regions of interest within the body. Medical personnel are able to select various regions of interest within the image for which further study is desired. In addition, within the region of interest the medical personnel may select a particular feature representing data corresponding to medical information within the body for which further study is desired and have the computer perform an analysis to compare to or locate other tissue of the same type elsewhere in the data sets. When such data analysis are performed on the images, analysis indicators are provided in the upper left hand corner of the display providing an easy to view indication of the results and status of any computer analysis being performed or that has been performed on the data. However, Daw's system fails to provide a function of automatically detect and differentiate image areas corresponding to materials (tissues) being imaged that have different time response to contrast enhancing agent. Such function is particularly useful in diagnosing malignant and benign breast tumors using MRI contrast enhanced images.

It is known that malignant breast tumors begin to grow their own blood supply network once they reach a certain size; this is the way the cancer can continue to grow. In a breast MRI scan, a contrast agent injected into the bloodstream can provide information about blood supply to the breast tissues; the agent "lights up" a tumor by highlighting its blood vessel network. Usually, several scans are taken: one before the contrast agent is injected and at least one after. The pre-contrast and post-contrast images are compared and areas of difference are highlighted. It should be recognized that if the patient moves even slightly between the two scans, the shape or size of the image may be distorted—a big loss of information.

An contrast agent for MRI is Gadolinium or gadodiamide, and provides contrast between normal tissue and abnormal tissue in the brain and body.

Gadolinium looks clear like water and is non-radioactive. After it is injected into a vein, Gadolinium accumulates in the abnormal tissue that may be affecting the body or head. Gadolinium causes these abnormal areas to become bright (enhanced) on the MRI. This makes it easy to see. Gadolinium is then cleared from the body by the kidneys. Gadolinium allows the MRI to define abnormal tissue with greater clarity. Tumors enhance after Gadolinium is given. The exact size of the tumor and location is important in treatment planning and follow up. Gadolinium is also helpful in finding small tumors by making them bright and easy to see.

Dynamic contrast enhanced MRI is used for breast cancer imaging; in particular for those situation that have an inconclusive diagnosis based on x-ray mammography. The MRI study involves intravenous injection of a contrast agent (typically gadopentetate dimeglumine) immediately prior to acquiring a set of T1-weighted MR volumes with a temporal resolution of around a minute. The presence of contrast agent within an imaging voxel results in an increased signal that can be observed over the time course of the experiment.

Study of these signal-time curves enables identification of different tissue types due to their differential contrast uptake properties as illustrated in FIG. 1. Typically, cancerous tissue shows a high and fast uptake due to a proliferation of "leaky" angiogenic microvessels, while normal and fatty tissues show little uptake. The uptake (dynamic) curves have often been fitted using a pharmacokinetic model to give a physiologically relevant parameterisation of the curve (refer to P. S. Tofts, B. Berkowitz, M. Schnall, "Quantitative analysis of dynamic Gd-DTPA enhancement in breast tumours using a permeability model", *Magn Reson Med* 33, pp 564-568, 1995).

U.S. Pat. No. 6,353,803 (Degani, Hadassa), incorporated herein by reference, is directed to an apparatus and method for monitoring a system in which a fluid flows and which is characterized by a change in the system with time in space. A preselected place in the system is monitored to collect data at two or more time points correlated to a system event. The data is indicative of a system parameter that varies with time as a function of at least two variables related to system wash-in and wash-out behavior.

Study of these curves/parameters has been used clinically to identify and characterize tumors into malignant or benign classes, although the success has been variable with generally good sensitivity but often very poor specificity (refer to S. C. Rankin "MRI of the breast", *Br. J. Radiol* 73, pp 806-818, 2000).

While such systems may have achieved certain degrees of success in their particular applications, there is a need for an improved digital image processing method for medical image analysis that overcomes the problems set forth above and addresses the utilitarian needs set forth above.

The present invention provides a method for automatically detecting and differentiating abnormal tissues in contrast enhanced MRI images.

SUMMARY OF THE INVENTION

An object of the present invention is to provide a method for automatically detecting and differentiating abnormal tissues in contrast enhanced MRI images.

Any objects provided are given only by way of illustrative example, and such objects may be exemplary of one or more embodiments of the invention. Other desirable objectives and advantages inherently achieved by the disclosed invention may occur or become apparent to those skilled in the art. The invention is defined by the appended claims.

The present invention provides a pattern recognition method for automatic abnormal tissue detection and differentiation using contrast enhanced MRI images augmented with other physical or non-physical factors. The method includes the steps of acquiring a plurality of MRI breast image sets; aligning the plurality of MRI breast images with respect to spatial coordinates; differencing the plurality of MRI breast image sets with a reference MRI image set, producing a plurality of difference image sets; segmenting the plurality of difference image sets, producing a plurality of MRI breast images with segmented intensity pixels; applying dynamic system identification to the segmented intensity pixels, producing a plurality of dynamic system parameters; and classifying the plurality of system parameters augmented with other physical or non-physical factors into different classes.

According to one aspect of the invention, there is provided a method for automatic material classification. The method includes the steps of: acquiring a plurality of image sets of an object sequentially in time; aligning the plurality of image sets with respect to spatial coordinates; differencing the plurality of image sets with a reference image set to produce a plurality of difference image sets; segmenting the plurality of difference image sets to produce a plurality of images with segmented intensity pixels; applying dynamic system identification to the segmented intensity pixels of the plurality of images to produce a plurality of dynamic system parameters; and classifying the plurality of system parameters into different classes.

According to another aspect of the invention, there is provided a method for abnormal tissue detection using contrast enhanced MRI images. The method includes the steps of: acquiring a plurality of MRI breast image sets sequentially in time; aligning the plurality of MRI breast image sets with respect to spatial coordinates; differencing the plurality of MRI breast image sets with a reference MRI image set to produce a plurality of difference image sets; segmenting the plurality of difference image sets to produce a plurality of MRI breast image sets with segmented intensity pixels; applying a dynamic system identification to the segmented intensity pixels of the plurality of MRI breast image sets to produce a plurality of dynamic system parameters; and classifying the plurality of system parameters into different classes to detect abnormal tissue.

BRIEF DESCRIPTION OF THE DRAWINGS

The foregoing and other objects, features, and advantages of the invention will be apparent from the following more particular description of the embodiments of the invention, as illustrated in the accompanying drawings. The elements of the drawings are not necessarily to scale relative to each other.

DETAILED DESCRIPTION OF THE INVENTION

Figure 1:
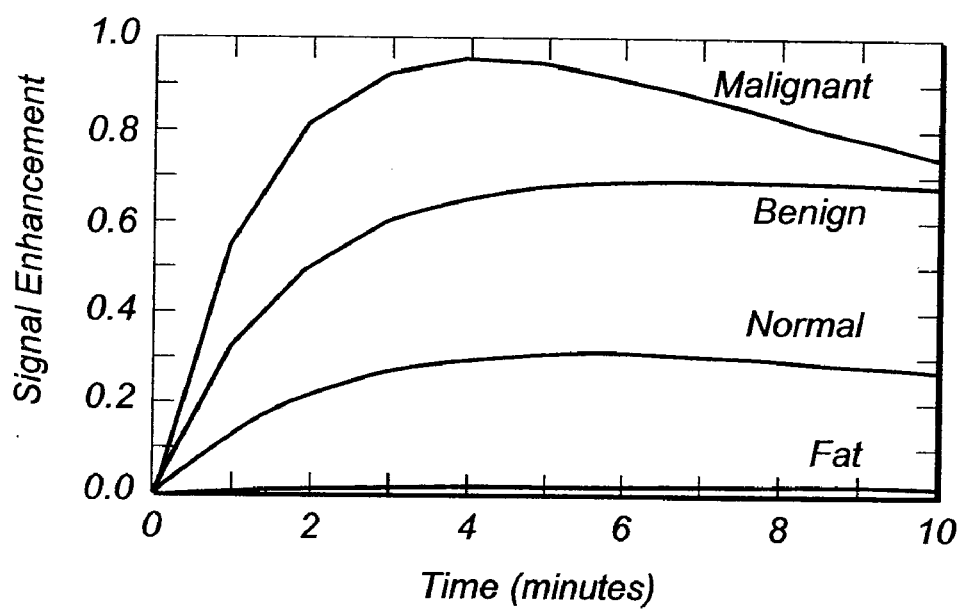
FIG. 1 is a graph illustrating dynamic contrast uptake properties (curves) for different breast tissues.

The following is a detailed description of the preferred embodiments of the invention, reference being made to the drawings in which the same reference numerals identify the same elements of structure in each of the several figures.

Figure 2:
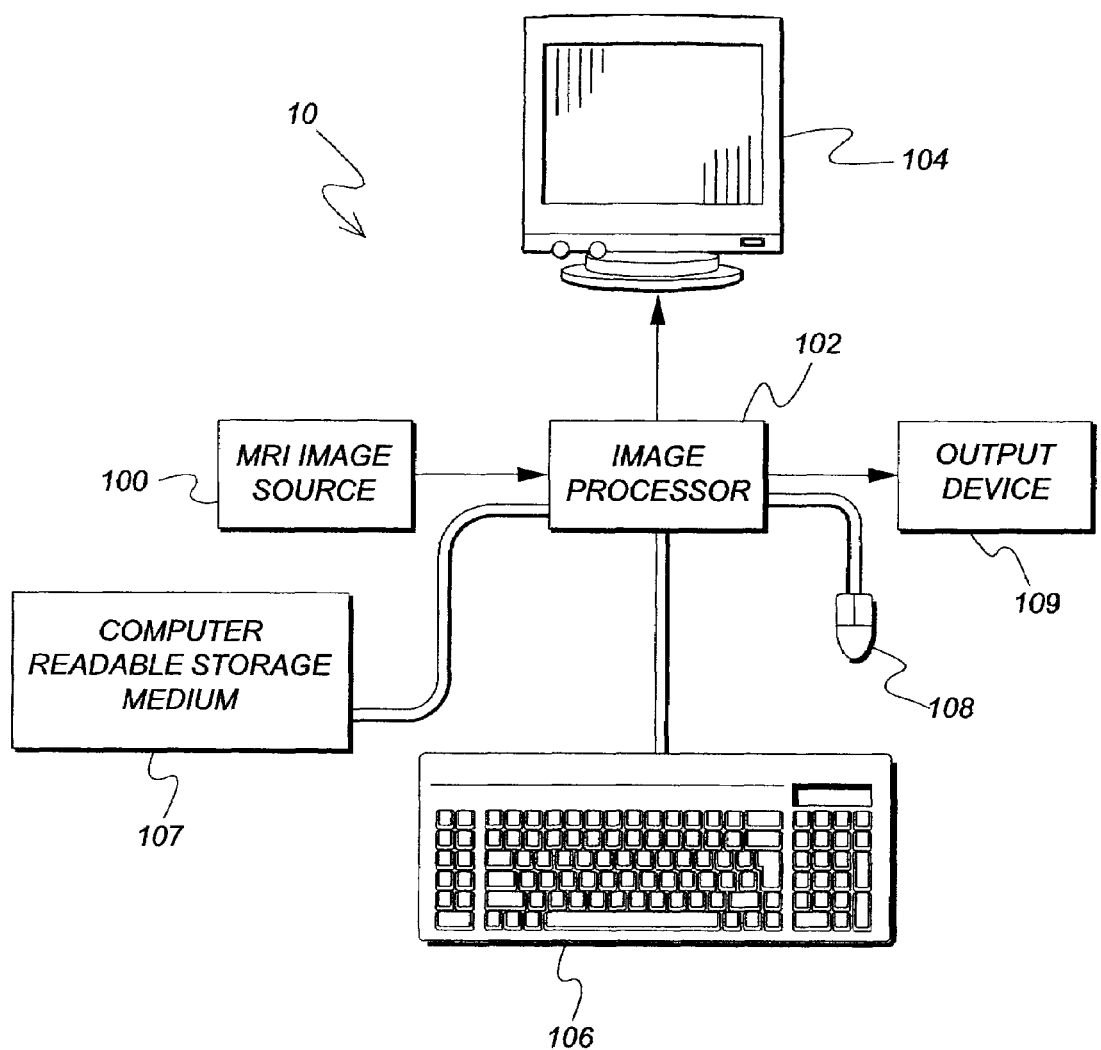
FIG. 2 is a schematic diagram of an image processing system useful in practicing the method in accordance with present invention.

FIG. 2 shows an image processing system 10 useful in practicing the method in accordance with the present invention. System 10 includes a digital MRI image source 100, for example, an MRI scanner, a digital image storage device (such as a compact disk drive), or the like. The digital image from digital MRI image source 100 is provided to an image processor 102, for example, a programmable personal computer, or digital image processing work station such as a Sun Sparc workstation. Image processor 102 can be connected to a display 104 (such as a CRT display or other monitor), an operator interface such as a keyboard 106, and a mouse 108 or other known input device. Image processor 102 is also connected to computer readable storage medium 107. Image processor 102 transmits processed digital images to an output device 109. Output device 109 can comprise a hard copy printer, a long-term image storage device, a connection to another processor, an image telecommunication device connected, for example, to the Internet, or the like.

In the following description, a preferred embodiment of the present invention will be described as a method. However, in another preferred embodiment, the present invention comprises a computer program product for detecting abnormal tissues in a digital MRI image in accordance with the method described. In describing the present invention, it should be recognized that the computer program of the present invention can be utilized by any well-known computer system, such as the personal computer of the type shown in FIG. 2. However, other types of computer systems can be used to execute the computer program of the present invention. For example, the method of the present invention can be executed in the computer contained in a digital MRI machine or a PACS (picture archiving communication system). Consequently, the computer system will not be discussed in further detail herein.

It will be further recognized that the computer program product of the present invention can make use of image manipulation algorithms and processes that are well known. Accordingly, the present description will be directed in particular to those algorithms and processes forming part of, or cooperating more directly with, the method of the present invention. Thus, it will be understood that the computer program product embodiment of the present invention may embody algorithms and processes not specifically shown or described herein that are useful for implementation. Such algorithms and processes are conventional and within the ordinary skill in such arts.

Other aspects of such algorithms and systems, and hardware and/or software for producing and otherwise processing the images involved or co-operating with the computer program product of the present invention, are not specifically shown or described herein and can be selected from such algorithms, systems, hardware, components, and elements known in the art.

A computer program for performing the method of the present invention can be stored in a computer readable storage medium. This medium may comprise, for example: magnetic storage media such as a magnetic disk (such as a hard drive or a floppy disk) or magnetic tape; optical storage media such as an optical disc, optical tape, or machine readable bar code; solid state electronic storage devices such as random access memory (RAM), or read only memory (ROM); or any other physical device or medium employed to store a computer program. The computer program for performing the method of the present invention may also be stored on computer readable storage medium that is connected to the image processor by way of the Internet or other communication medium. Those skilled in the art will readily recognize that the equivalent of such a computer program product may also be constructed in hardware.

Figure 3:
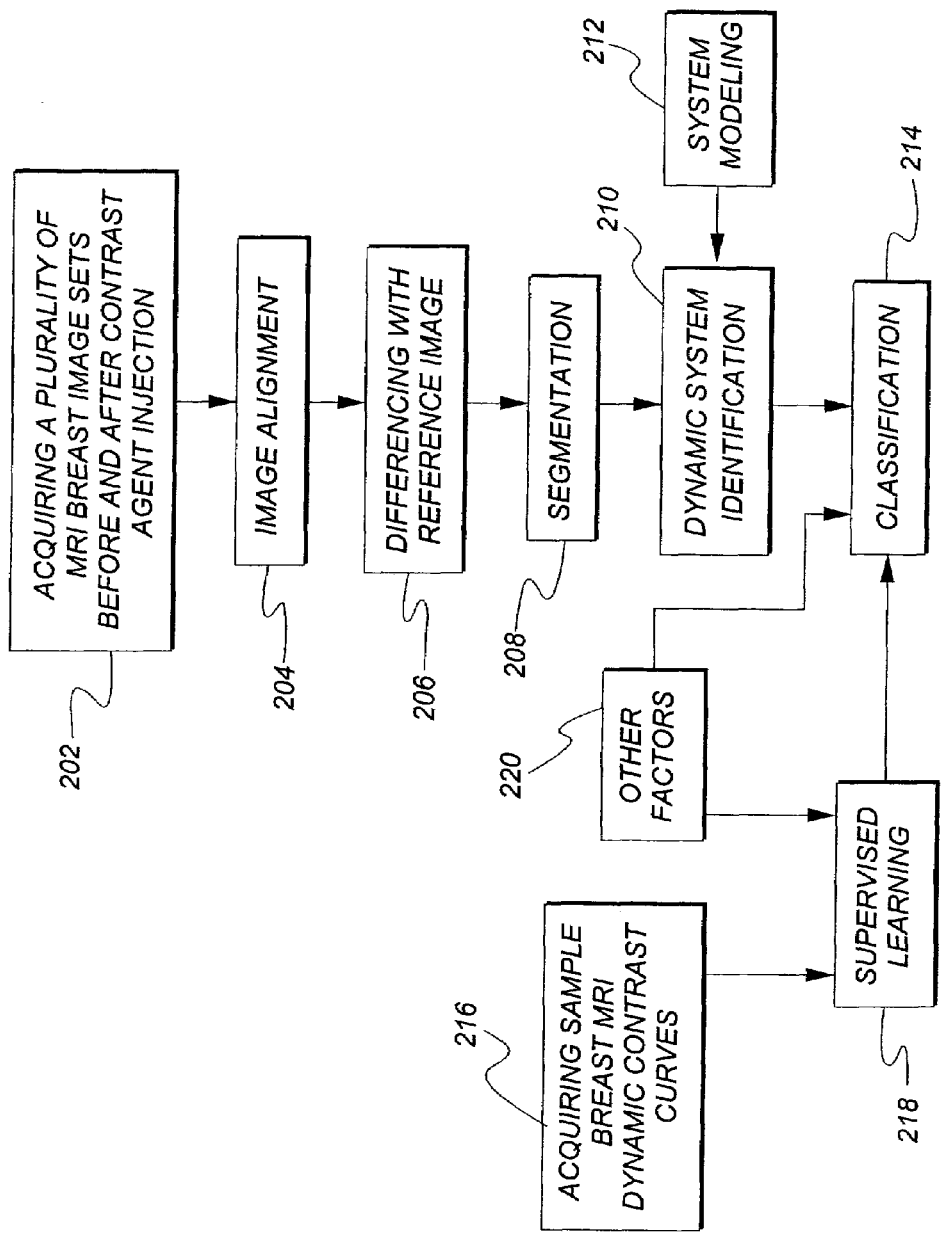
FIG. 3 is a flow chart illustrating one embodiment of the automatic abnormal tissue detection method in accordance with the present invention.

Turning now to FIG. 3, the method of the present invention will be outlined. FIG. 3 is a flow chart illustrating one embodiment of the automatic abnormal tissue detection method of the present invention. In the embodiment shown in FIG. 3, a plurality of MRI breast images sets acquired before and after contrast agent injection go through a series of processes. Each of these processes performs a specific functionality such as alignment, subtraction, segmentation, system identification, and classification. In the present invention, abnormal tissue detection tasks are accomplished by a means of dynamic system parameter classification.

In the embodiment shown in FIG. 3, a first step 202 is employed for acquiring a plurality of MRI breast image sets before and after an injection of contrast agent.

Denote $I_0(x, y, z)$ as a set of MRI image for a breast with a number of images (slices) in a spatial order before an injection of contrast agent, where $z \in [1, \ldots S]$ is the spatial order index, s is the number of images in the set, x and y are the horizontal and vertical indices respectively for an image where $x \in [1, \ldots X]$ and $y \in [1, \ldots Y]$. After the administration of contrast agent, a plurality of MRI image sets is acquired with the same number (S) of images of the same breast for each set in the same spatial order z. The plurality of MRI image sets is taken with a temporal resolution, for example, of around a minute. This MRI image sets can be expressed by $I_k(x, y, z)$ where k is the temporal order index and $k \in [1, \ldots K]$; K is the number of sets.

The presence of a contrast agent within an imaging voxel results in an increased signal that can be observed over the time course of the image acquisition process. Study of these signal-time curves enables identification of different tissue types due to their differential contrast uptake properties. For the purpose of automatic detection of abnormal tissues, the K sets of MRI images, $I_k(x, y, z)$, taken after the injection of contrast agent have to be spatially aligned, in a step 204, with a reference set of MRI images with respect to spatial coordinates x, y. In general, the reference set of MRI image is the set of MRI images, $I_0(x, y, z)$, taken before the injection of the contrast agent. The alignment process ensures that pixels belong to a same tissue region of the breast have the same x, y coordinates in all the K sets of images. The alignment process executes the following

```
for     k=1 : K
    for         z=1 : S
        align(I_k(x,y,z), I_0(x,y,z))
    end
end
```

An exemplary method employable to realize the alignment function, align(A, B), is a non-rigid registration that aligns A with B and is widely used in medical imaging and remote sensing fields. Persons skilled in the art will recognize that other registration methods could also be used.

As was shown in FIG. 1, after the injection of contrast agent, image pixel intensity increases differently for different breast tissues. This phenomenon indicates that subtracting the image taken before the injection from the image taken after the injection will provide radiologists with clearer information of locations of abnormal tissues in the image. This information can also be used to extract regions from the original MRI breast images for automatic abnormal tissue detection and differentiation. This information is obtained in step 206 in FIG. 3 that carries out differencing the plurality of MRI breast image sets, $I_k$ (x, y, z), k ∈ [1, . . . K] with a reference MRI image set to produce a plurality of difference image sets, $\delta I_k$ (x, y, z), k ∈ [1, . . . K]. The set of MRI images, $I_0$ (x, y, z), is selected as intensity reference images. The differencing process is executed as following:

```
for    k=1 : K
    for    z=1 : S
        δI_k(x,y,z)=subtraction(I_k(x,y,z), I_0(x,y,z))
    end
end
``` wherein the function, subtraction(A, B), subtracts B from A.

In FIG. 3 at step 208, the difference images, $\delta I_k$ (x, y, z), are subject to a segmentation process that first evaluates the plurality of difference image sets $\delta I_k$ (x, y, z), and produces a plurality of mask image sets, $M_k$ (x, y, z), k ∈ [1, . . . K] obtained by executing:

```
for    k=1 : K
    for    z=1 : S
        for    x=1 : X
            for    y=1 : Y
                if δI_k(x,y,z)>T
                    M_k(x,y,z)=1
                end
            end
        end
    end
end
``` wherein mask image sets, $M_k$ (x, y, z), k ∈ [1, . . . K], are initialized with zeros, T is a statistical intensity threshold. An exemplary value of T is an empirical value 10.

The segmentation process in step 208 segments the images in the plurality of MRI breast image sets, $I_k$ (x, y, z), according to the non-zero pixels in the mask images, $M_k$ (x, y, z), to obtain segmented intensity pixels in the images of the plurality of MRI breast image sets. Denote the resultant images by $S_k$ (x, y, z), k ∈ [1, . . . K], the segmentation operation can be expressed as:

```
for    k=1 : K
    for    z=1 : S
        for    x=1 : X
            for    y=1 : Y
                if M_k(x,y,z)=1
                    S_k(x,y,z)=I_k(x,y,z)
                end
            end
        end
    end
end
``` wherein images, $S_k$ (x, y, z), are initialized as zeros. Persons skilled in the art will recognize that, in practical implementation, the stage of generating mask images can be omitted and the segmentation process can be realized by executing the following:

```
for    k=1 : K
    for    z=1 : S
        for    x=1 : X
            for    y=1 : Y
                if δI_k(x,y,z)>T
                    S_k(x,y,z)=I_k(x,y,z)
                end
            end
        end
    end
end
``` wherein images, $S_k$ (x, y, z), are initialized as zeros.

Figure 4:
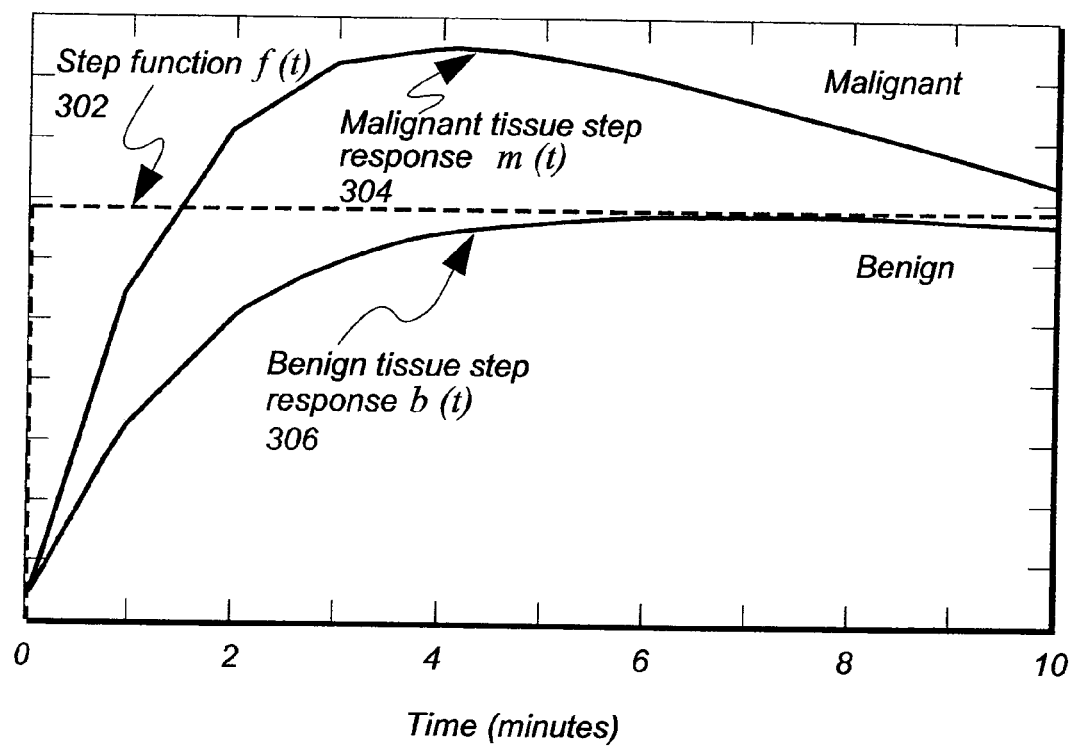
FIG. 4 is a graph illustrating dynamic contrast uptake properties (curves) for malignant and benign tumor tissues.

Referring now to FIG. 4, there is shown a chart that is a replica to the chart shown in FIG. 1 except that FIG. 4 includes the insertions of a step function, $f(t)$, curve 302 and the removal of the normal and fat tissue curves.

It is the intention of the present invention to detect abnormal tissues and more importantly to differentiate Malignant from Benign tissues. (Note: the step function, $f(t)$, is defined as $f(t<0)=0$; $f(t\geq 0)=|\lambda|$; $\lambda \neq 0$). Pixels that belong to normal and fat tissues are set to zeros in images $S_k$ (x, y, z) in the segmentation step 208. The remaining pixels in images $S_k$ (x, y, z) belong to either malignant or benign tissues. It is practically difficult if not impossible to differentiate malignant tissue from benign tissue by just assessing the pixels brightness (intensity) in a static form, that is, in individual images. However, in a dynamic form, the brightness changes present a distinction between these two types of tissues. As shown in FIG. 4, starting from time zero, the brightness (contrast) curve 304, m(t), of the malignant tissue rises quickly above the step function curve 302 and then asymptotically approaches the step function curve 302; while the brightness (contrast) curve 306, b(t), of the benign tissue rises slowly underneath the step function curve 302 and then asymptotically approaches the step function curve, $f(t)$, 302.

Persons skilled in the art can recognize that the brightness (contrast) curve 304, m(t), resembles a step response of an underdamped dynamic system, while the brightness (contrast) curve 306, b(t), resembles a step response of an overdamped dynamic system.

Figure 5:
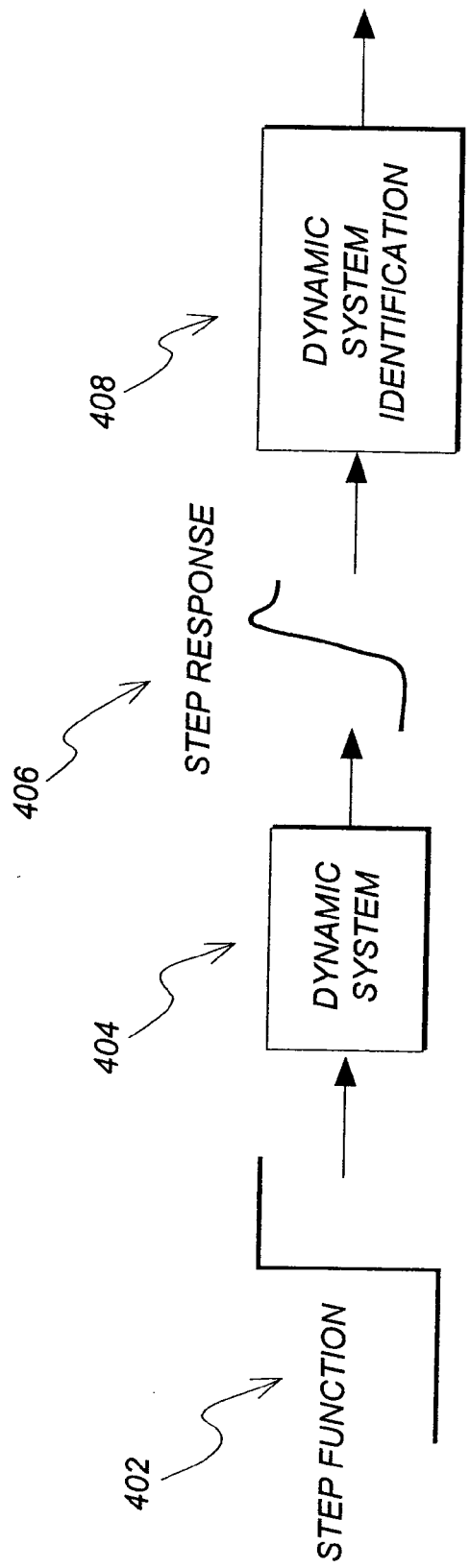
FIG. 5 is a schematic diagram illustrating the concept of step function response and system identification.

An exemplary generic approach to identifying a dynamic system behavior is generally depicted in FIG. 5. For an unknown dynamic system 404, a step function 402 is used as an excitation. A response 406 to the step function 402 from the dynamic system 404 is fed to a system identification step 408 in order to estimate dynamic parameters of system 404.

Figure 6:
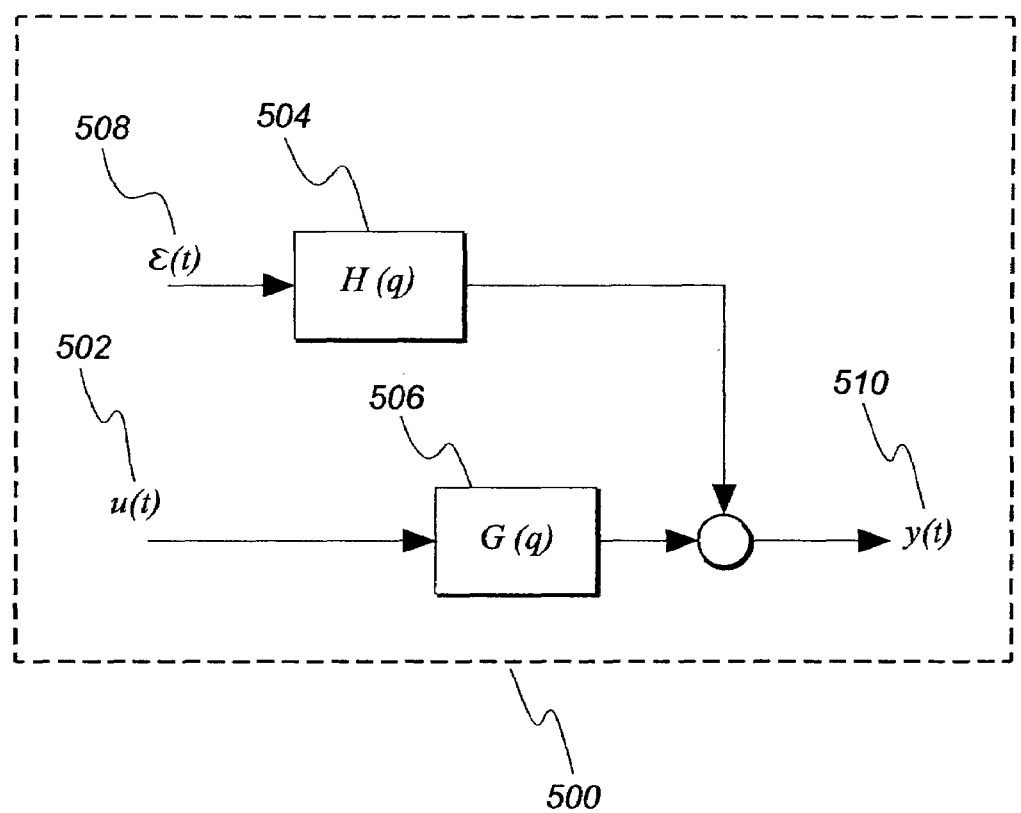
FIG. 6 is a flowchart illustrating a method of system identification in accordance with the present invention.

An exemplary realization of dynamic system modeling 212 (of FIG. 3) is shown in FIG. 6 where it is shown an ARX (autoregressive) model 500 (refer to "System identification Toolbox", by Lennart Ljung, The Math Works).

A general ARX model can be expressed as the equation:

$$y(t)=G(q)f(t)+H(q)\in(t) \quad (1)$$

where G(q) (506) and H(q) (504) are the system transfer functions as shown in FIG. 6, u(t) (502) is the excitation, ∈(t) (508) is the disturbance, and y(t) (510) is the system output. It is known that the transfer functions G(q) (506) and H(q) (504) can be specified in terms of rational functions of $q^{-1}$ and specify the numerator and denominator coefficients in the forms:

$$G(q) = q^{-nk}\frac{B(q)}{A(q)} \quad (2)$$

$$H(q) = \frac{1}{A(q)} \quad (3)$$

wherein A and B are polynomials in the delay operator $q^{-1}$;

$$A(q)=1+a_1q^{-1}+\ldots+a_{na}q^{-na} \quad (4)$$

$$B(q)=b_1+b_2q^{-1}+\ldots+a_{nb}q^{-nb+1} \quad (5)$$

When A and B are polynomials, the ARX model of the system can be explicitly rewritten as:

$$y(t)=-a_1y(t-1)-\ldots-a_{na}y(t-na)+b_1u(t-nk)+\ldots$$
$$b_{nb}u(t-nk-nb+1)+e(t) \quad (6)$$

Equation (6) can be further rewritten as a regression as follows:

$$y(t) = \varphi(t)^T \theta \quad (7)$$

where $$\varphi(t) = \begin{bmatrix} -y(t-1) \\ \vdots \\ -y(t-na) \\ u(t-nk) \\ \vdots \\ u(t-nk-nb+1) \end{bmatrix} \text{ and } \theta = \begin{bmatrix} a_1 \\ \vdots \\ a_{na} \\ b_1 \\ \vdots \\ b_{nb} \end{bmatrix}$$

The system identification solution for the coefficient vector $\theta$ is $$\hat{\theta} = (\Phi^T\Phi)^{-1}\Phi^T Y \quad (8)$$

where $$\Phi = \begin{bmatrix} \varphi^T(t_0) \\ \vdots \\ \varphi^T(t_0+N_t-1) \end{bmatrix} \quad (9)$$

and $$Y = \begin{bmatrix} y(t_0) \\ \vdots \\ y(t_0+N_t-1) \end{bmatrix} \quad (10)$$

In Equations (9) and (10), $t_0$ is the data sampling starting time and $N_t$ is the number of samples.

In relation to the brightness (contrast) curve m(t) 304, and the brightness (contrast) curve b(t) 306, $$\varphi(t) = \begin{bmatrix} -m(t-1) \\ \vdots \\ -m(t-na) \\ u(t-nk) \\ \vdots \\ u(t-nk-nb+1) \end{bmatrix} \text{ and }$$

$$\varphi(t) = \begin{bmatrix} -b(t-1) \\ \vdots \\ -b(t-na) \\ u(t-nk) \\ \vdots \\ u(t-nk-nb+1) \end{bmatrix}$$

respectively.

In this particular case, u(t) is a step function. And the corresponding solutions are $\hat{\theta}_m$ and $\hat{\theta}_b$. The computation of $\hat{\theta}$ realizes the step of Dynamic system identification 210 (also step 408).

Referring again to FIG. 3, in order to classify (step 214) a region with high contrast brightness in MRI images as benign or malignant tumor, a supervised learning step 218 is needed.

A supervised learning is defined as a learning process in which the exemplar set consists of pairs of inputs and desired outputs. In this MRI image breast tissue classification case, the exemplar inputs are $\hat{\theta}_m$ and $\hat{\theta}_b$ (or the known curves), the exemplar desired outputs are indicators $O_m$ and $O_b$ for malignant and benign tumors respectively. In FIG. 3, step 218 receives M sample breast MRI dynamic curves with known characteristics (benign or malignant) from step 216. An exemplary value for M could be 100. Within the M curves, there are $M_m$ curves belong to malignant tumors and $M_b$ curves belong to benign tumors. Exemplary values for $M_m$ and $M_b$ could be 50 and 50. In step 218, applying Equation (8) to all the sample curves generates M coefficient vectors $\hat{\theta}$ among which, $M_m$ coefficient vectors (denoted by $\hat{\theta}_m^i$, i=1 ... $M_m$) represent malignant tumor with indicator $O_m$, and $M_b$ coefficient vectors (denoted by $\hat{\theta}_b^i$, i=1 ... $M_b$) represent benign tumor with indicator $O_b$. These learned coefficient vectors $\hat{\theta}_m^i$ and $\hat{\theta}_b^i$ are used to train a classifier that in turn is used to classify a dynamic contrast curve in a detection or diagnosis process.

To increase the specificity (accuracy in differentiating benign tumors from malignant tumors) other factors (step 220) can be incorporated into the training (learning) and classification process. It is known that factors such as the speed of administration of the contrast agent, timing of contrast administration with imaging, acquisition time and slice thickness (refer to "Contrast-enhanced breast MRI: factors affecting sensitivity and specificity", by C. W. Piccoli, Eur. Radiol. 7 (Suppl. 5), S281-S288 (1997)).

Denote the speed of administration of the contrast agent by $\alpha$, the timing of contrast administration with imaging by $\beta$, the acquisition time by $\gamma$ and slice thickness by $\delta$. These exemplary factors are to be used in conjunction with the coefficient vectors $\hat{\theta}_m^i$ and $\hat{\theta}_b^i$ to train the classify that that in turn is used to classify a region in the MRI breast image into malignant or benign tumor classes. Noted that these exemplary factors should be quantified in a range comparable to that of the coefficient vectors $\hat{\theta}_m^i$ and $\hat{\theta}_b^i$.

For the learning and training purpose, construct the training data set $$\{p_j,\tau_j\}, j=1\ldots l, \tau_j=\{-1,1\}, p_j \in R^d \quad (11)$$

wherein $\tau_j$ are the class labels.

For example, if the tumor is malignant, $\tau_j=1$, otherwise, $\tau_j=-1$. The vector $p_j=[\hat{\theta}, \alpha, \beta, \gamma, \delta]$ is traditionally called feature vector in computer vision literature. The notion $R^d$ represents a domain, d is the domain dimension. For this exemplary case, assume that the coefficient vector θ has five elements, then d=9. The data format in Equation (11) is used in leaning step 218 as well as in classification step 214. Persons skilled in the art understand that the data vector $p_j$ can be constructed in a different manner and augmented with different physical or non-physical numerical elements (factors) other than the ones aforementioned.

There are known types of classifiers that can be used to accomplish the task of differentiating malignant tumors from benign tumors with the use of dynamic contrast curves along with other physical or non-physical factors. An exemplary classifier is an SVM (support vector machine) (refer to "A Tutorial on Support Vector Machines for Pattern Recognition", by C. Burges, *Data Mining and Knowledge Discovery,* 2(2), 1-47, 1998, Kiuwer Academic Publisher, Boston, with information available at the website:

http://aya.technion.ac.il/karniel/CMCC/SVM-tutorial.pd.f).

An example case of an SVM classifier would be training and classification of data representing two classes that are separable by a hyper-plane. A hyper-plane that separates the data satisfies $$w \cdot p + \sigma = 0 \quad (12)$$

where · is a dot product.

The goal of training the SVM is to determine the free parameter w and σ. A scaling can always be applied to the scale of w and σ such that all the data obey the paired inequalities:

$$\tau_j(w \cdot p_j + \sigma) - 1 \geq 0, \forall_j \quad (13)$$

Equation (13) can be solved by minimizing a Lagrangian function $$L(w, \xi) = \frac{1}{2} \|w\|^2 - \sum_{j=1}^{l} \xi_j(\tau_j(w \cdot p_j + \sigma)) \quad (14)$$

with respect to the parameter w, and maximize it with respect to the undetermined multipliers $\xi_j \geq 0$.

After the optimization problem has been solved, the expression for w in Equation (13) can be rewritten in terms of the support vectors with non-zero coefficients, and plugged into the equation for the classifying hyper-plane to give the SVM decision function:

$$\Psi(p_{new}) = (w \cdot p_{new} + \sigma) = \sum_{j=1}^{l_s} \tau_j \xi_j p_j \cdot p_{new} + \sigma \quad (15)$$

wherein $l_s$ is the number of support vectors. Classification of a new vector $p_{new}$, into one of the two classes (malignant and benign) is based on the sign of the decision function. Persons skilled in the art will recognize that in non-separable case, non-linear SVMs can be used.

The subject matter of the present invention relates to digital image processing and computer vision technologies, which is understood to mean technologies that digitally process a digital image to recognize and thereby assign useful meaning to human understandable objects, attributes or conditions, and then to utilize the results obtained in the further processing of the digital image.

The invention has been described in detail with particular reference to a presently preferred embodiment, but it will be understood that variations and modifications can be effected within the spirit and scope of the invention. The presently disclosed embodiments are therefore considered in all respects to be illustrative and not restrictive. The scope of the invention is indicated by the appended claims, and all changes that come within the meaning and range of equivalents thereof are intended to be embraced therein.

| PARTS LIST |
| --- |
| 100 MRI image source |
| 102 image processor |
| 104 image display |
| 106 data and command entry device |
| 107 computer readable storage medium |
| 108 data and command control device |
| 109 output device |
| 202 a step |
| 204 a step |
| 206 a step |
| 208 a step |
| 210 a step |
| 212 a step |
| 214 a step |
| 216 a step |
| 218 a step |
| 220 a step |
| 302 step function |
| 304 malignant tissue step response curve |
| 306 benign tissue step response curve |
| 402 step function |
| 404 dynamic system |
| 406 step response |
| 408 dynamic system identification |
| 500 ARX model |
| 502 excitation signal |
| 504 transfer function |
| 506 transfer function |
| 508 noise signal |
| 510 system output |

We claim:

1. A method for automatic material classification, comprising the steps of:

acquiring a plurality of image sets of an object sequentially in time;

aligning the plurality of image sets with respect to spatial coordinates;

differencing the plurality of image sets with a reference image set to produce a plurality of difference image sets;

segmenting the plurality of difference image sets to produce a plurality of images with segmented intensity pixels;

applying dynamic system identification to the segmented intensity pixels of the plurality of images to produce a plurality of dynamic system parameters; and classifying the plurality of system parameters into different classes.

2. The method of claim 1, further comprising the step of, prior to classifying the plurality of system parameters, augmenting the system parameters with other physical or non-physical factors.

3. A method for abnormal tissue detection using contrast enhanced MRI images, comprising the steps of:

acquiring a plurality of MRI breast image sets sequentially in time;

aligning the plurality of MRI breast image sets with respect to spatial coordinates;

differencing the plurality of MRI breast image sets with a reference MRI image set to produce a plurality of difference image sets;

segmenting the plurality of difference image sets to produce a plurality of MRI breast image sets with segmented intensity pixels;

applying a dynamic system identification to the segmented intensity pixels of the plurality of MRI breast image sets to produce a plurality of dynamic system parameters; and classifying the plurality of system parameters into different classes to detect abnormal tissue.

4. The method of claim 3, wherein the contrast enhanced MRI images are augmented with physical and/or non-physical factors.

5. The method of claim 3, further comprising the step of, prior to classifying the plurality of system parameters, augmenting the system parameters with other physical or non-physical factors.

6. The method of claim 3, wherein the step of acquiring a plurality of MRI breast image sets includes the steps of
  acquiring a set of MRI images for a breast with a number of images in a spatial order prior to an injection of contrast agent;
  acquiring a plurality of MRI image sets, each set having an equal number of images, of the same breast in the same spatial order after the injection of contrast agent; and
  organizing the plurality of acquired MRI image sets in a temporal order.

7. The method of claim 3, wherein the step of aligning the plurality of MRI breast image sets with respect to spatial coordinates includes the steps of:
  selecting one of the plurality of MRI image sets as an alignment reference set; and
  using a localized registration to align the remaining plurality of MRI image sets to the alignment reference set.

8. The method of claim 3, wherein the step of differencing the plurality of MRI breast image sets with a reference MRI image set includes the steps of:
  selecting one of the plurality of MRI image sets as an intensity reference image set; and
  subtracting the intensity reference image set from the remaining plurality of MRI image sets to obtain the plurality of difference image sets.

9. The method of claim 3, wherein the step of segmenting the plurality of difference image sets includes the steps of
  selecting a statistical intensity threshold;
  thresholding the plurality of difference image sets using the statistical intensity threshold to set the pixels with intensity value under the threshold to zeros in the plurality of difference image sets; and
  segmenting the plurality of MRI breast image sets according to the remaining non-zero pixels in the plurality of difference image sets to obtain the segmented intensity pixels in the plurality of MRI breast image sets.

10. The method of claim 3, wherein the step of applying a dynamic system identification includes the steps of:
  (a) forming vectors of indexed images whereby indices are corresponding to a temporal order of the plurality of MRI breast image sets and each vector comprises the images at the same spatial position across the plurality of MRI breast image sets;
  (b) in the formed vector of indexed images, determining an image that has a largest number of segmented intensity pixels and using the segmented intensity pixels as seed pixels;
  (c) for each of the seed pixels, selecting corresponding segmented intensity pixels in the other images of the formed vector and forming an intensity pixel sequence, which includes the seed pixel, in the temporal order;
  (d) applying dynamic system identification to the sequence of intensity pixels to produce the plurality of dynamic system parameters for the sequence of intensity pixels; and
  (e) applying steps (b), (c), and (d) to the remaining vectors of indexed images.

11. The method of claim 10, wherein the step of classifying the plurality of system parameters includes steps of:
  in a temporal order, collecting contrast enhanced MRI breast training image sets having different known abnormal tissues;
  using the contrast enhanced MRI breast training image sets with known abnormal tissues to obtain sample dynamic system parameters for different abnormal tissues;
  training a classifier using a supervised learning method using the sample dynamic system parameters augmented with other factors; and
  classifying the dynamic system parameters augmented with other factors into different classes using the trained classifier.

12. A pattern recognition method for abnormal tissue detection using contrast enhanced MRI images, comprising the steps of:
  acquiring a plurality of MRI breast image sets sequentially in time;
  aligning the plurality of MRI breast image sets with respect to spatial coordinates;
  generating a plurality of difference image sets by differencing the plurality of MRI breast image sets with a reference MRI image set;
  generating a plurality of MRI breast image sets with segmented intensity pixels by segmenting the plurality of difference image sets;
  producing a plurality of dynamic system parameters by applying a dynamic system identification to the segmented intensity pixels of the plurality of MRI breast image sets; and
  classifying the plurality of system parameters into different classes to detect abnormal tissue.

* * * * *